United States Patent [19]

Dahlstrom

[11] 4,443,484

[45] Apr. 17, 1984

[54] METHOD FOR PRESERVATION OF MEAT PRODUCTS

[75] Inventor: Robert V. Dahlstrom, Novato, Calif.

[73] Assignee: Stauffer Chemical Company, Westport, Conn.

[21] Appl. No.: 483,801

[22] Filed: Apr. 11, 1983

[51] Int. Cl.³ .............................................. A23B 4/14
[52] U.S. Cl. .................................... 426/266; 426/332; 426/641
[58] Field of Search .............. 426/265, 266, 332, 641, 426/646, 652, 331; 424/304; 260/465 K

[56] References Cited

U.S. PATENT DOCUMENTS 3,159,532 12/1964 Heininger et al. .............. 260/465 K Primary Examiner—Arthur L. Corbin
Attorney, Agent, or Firm—Joel G. Ackerman

[57] ABSTRACT

The compound 3-(4-tolysulfonyl) acrylonitrile, when incorporated in meat products together with an alkali metal nitrite salt, has been found effective in inhibiting the growth of *Clostridium botulinum* and consequent production of toxin in meat products on storage.

4 Claims, No Drawings

METHOD FOR PRESERVATION OF MEAT PRODUCTS

BACKGROUND AND PRIOR ART

This invention relates to a method and composition for inhibiting the growth of the bacteria *Clostridium botulinum* in meat products, particularly comminuted meat products, and most particularly pork products of such type.

For many years it has been standard practice to add sodium nitrite to preserve meat products by inhibiting the growth of *Clostridium botulinum* and the production of botulinum toxin in the meat products during storage.

The presence of sodium nitrite or other alkali metal nitrate as a food additive, particularly in smoked meats which are cooked at high temperatures, has been of increasing concern with the determination that sodium nitrite can combine with secondary and tertiary amines in cooked meats to form nitrosamines. A number of nitrosamines have been shown to be carcinogens in animals.

It is therefore desirable to reduce the amount of nitrite present in stored meat products. However, in so doing, it is also necessary to prevent the production of deadly botulinum toxin which may occur on storage. On June 15, 1978, The U.S. Department of Agriculture required that all bacon produced using nitrite must employ 120 parts per million (ppm) of sodium nitrite to prevent formation of botulinum toxin, and 550 ppm sodium ascorbate or sodium erythorbate to inhibit formation of nitrosamines.

The prior art describes several substances which have been found to inhibit *Clostridium botulinum* growth and/or the production of botulinum toxin when substituted for a portion of the nitrite. For instance, French Patent Application No. 77.09108 describes reduction of the amount of sodium nitrite necessary by substituting for a part of it large amounts of sorbic acid or salts thereof. U.S. Pat. Nos. 4,282,260 and 4,348,419 describe the substitution for sodium nitrite of hypophosphorous acid or its sodium, potassium, calcium or manganese salts. According to these U.S. patents, by the use of this acid or its salts, the amount of sodium nitrite present in the meat product may be reduced from a level of 120 ppm to approximately 40 ppm.

SUMMARY OF THE INVENTION

This invention provides a method for inhibiting the growth of *Clostridium botulinum* and the formation of botulinum toxin during storage of meat products by incorporation therein of an effective amount of the compound 3-(4-tolylsulfonyl) acrylonitrile. This compound has the formula $$CH_3-\text{C}_6\text{H}_4-SO_2CH=CHCN$$

and is disclosed, for instance, in U.S. Pat. No. 3,159,532.

DETAILED DESCRIPTION OF THE INVENTION

Experiments were conducted to determine the effect of the subject compound, 3-(4-tolylsulfonyl) acrylonitrile, on inhibition of the growth of *Clostridium botulinum* and the production of botulinum toxin in meat products, particularly pork products. Additionally, experiments were conducted to determine the level of reduction of sodium nitrite content possible by substitution of the subject compound for sodium nitrite in an amount so as to maintain effectiveness of controlling *Clostridium botulinum* while reducing the formation of nitrosamines due to a lower concentration of nitrite.

As will be shown by the experiments which follow, it was determined that incorporation of the subject compound, particularly in an amount of from 25 to 50 ppm, resulted in equal or better performance towards inhibition of *C. botulinum* with respect to sodium nitrite while permitting the amount of said nitrite to be reduced from a concentration of 120 ppm to one of about 40 ppm.

The experiments which follow were conducted in general according to the following procedures.

Batches of cured pork bellies having the following composition were prepared:

| | |
|---|---|
| Pork belly | 450.00 g |
| water | 35.00 g |
| salt | 6.75 g |
| dextrose | 4.50 g |
| sodium erythorbate | 50 ppm |

A mixed spore suspension of *Clostridium botulinum* was prepared as follows:

Four refrigerated Type A strains and six Type B strains were prepared and then diluted to a level of approximately 100 spores/milliliter (ml). A mixed inoculum of the suspensions was prepared by adding 3 ml of each culture to a sterile bottle. The level of spores in the mixed inoculum was determined to be 93 spores/ml.

The batches of cured pork belly were inoculated with 10 ml of the mixed spore suspension by adding the suspension to the cured meat system as it was being mixed. After each batch was mixed it was tightly packed in a cup and heated to a temperature of 128° F. (53° C.), which is the most common finishing temperature used in the bacon industry. Each batch was then placed in a plastic barrier bag and vacuum packaged. The vacuum packages were then placed in an incubator maintained at 80° F. (26.5° C.). The packages were incubated until obvious gas formation was evident and then analyzed for *Clostridium botulinum*.

When the test compound acrylonitrile was utilized, it was mixed with the meat by weighing out the amount required for a given weight of meat, dissolving in a minimum amount of water and comminuting with the meat to insure thorough distribution.

Experiment 1: Growth of *Clostridium botulinum* on Pork Belly Batches

Three batches of cured pork bellies were prepared as above, indicated as Batches A, B and C. The batches contained 0, 20 and 40 ppm of sodium nitrite, respectively. Results of this experiment are shown in the following Table I. The meat batches were shown to be satisfactory media for Clostridium growth.

TABLE I

GROWTH OF *C. BOTULINUM* IN TEST SYSTEM

| Batch | NaNO$_2$, ppm | Time/days | *C. botulinum*/g |
|---|---|---|---|
| A | 0 | 0 | — |
| | | 3 | 11,000,000 |
| B | 20 | 0 | — |
| | | 4 | 8,500,000 |
| C | 40 | 0 | — |

TABLE I-continued

| GROWTH OF C. BOTULINUM IN TEST SYSTEM | | | |
|---|---|---|---|
| Batch | NaNO2, ppm | Time/days | C. botulinum/g |
| | | 5 | 12,000,000 |

Experiment 2: Effect of Test Compound

Tests were conducted as in Experiment 1 with batches of cured pork belly containing varying concentrations of sodium nitrite and the subject acrylonitrile. Results of these experiments are given in the following Table II.

TABLE II

| Acrylonitrile Concentration (ppm) | Sodium Erythorbate Concentration (ppm) | Nitrite Concentration (ppm) | Time to gas Formation (days) | C. botulinum (No./gram) |
|---|---|---|---|---|
| 0 | 550 | 120 | 27 | 9,100,000 |
| 0 | 550 | 120 | 30 | 6,200,000 |
| 0 | 550 | 120 | 28 | 6,300,000 |
| 0 | 0 | 40 | 4 | 26,000,000 |
| 0 | 0 | 40 | 6 | 19,000,000 |
| 0 | 0 | 40 | 6 | 31,000,000 |
| 50 | 550 | 40 | *NG | 140,000 |
| 50 | 550 | 40 | 33 | 2,100,000 |
| 50 | 550 | 40 | *NG | 620,000 |
| 50 | 1000 | 40 | *NG | 90,000 |
| 50 | 1000 | 40 | *NG | 110,000 |
| 50 | 1000 | 40 | *NG | 40,000 |
| 25 | 550 | 40 | 28 | 4,300,000 |
| 25 | 550 | 40 | 30 | 7,200,000 |
| 25 | 550 | 40 | 30 | 6,200,000 |
| 25 | 1000 | 40 | 30 | 5,500,000 |
| 25 | 1000 | 40 | 32 | 6,300,000 |
| 25 | 1000 | 40 | 30 | 8,100,000 |
| 10 | 550 | 40 | 12 | 14,000,000 |
| 10 | 550 | 40 | 10 | 9,200,000 |
| 10 | 550 | 40 | 11 | 9,500,000 |
| 10 | 1000 | 40 | 12 | 12,000,000 |
| 10 | 1000 | 40 | 13 | 8,100,000 |
| 10 | 1000 | 40 | 12 | 13,000,000 |

*No gas noted at 35 days.

The formation of gas is an indication of the growth of the Clostridum organism under the conditions employed. As can be seen from the above table, using 25 ppm of the test acrylonitrile compound, together with 40 ppm nitrite, the results obtained in terms of Clostridium growth were approximately at the same level as when nitrite concentration was at 120 ppm, and far superior to the control obtained with nitrite concentration at only 40 ppm, in the absence of the acrylonitrile.

When the acrylonitrile was employed in a concentration of 50 ppm, results were far superior to any other tests; no gas evolution was observed after 35 days in most cases.

Experiment 3: Determination of Toxin Production in Meat After Storage

Various batches of cured pork belly were prepared as before, containing 0, 40 or 120 ppm nitrite, and in one group, a combination of 40 ppm nitrite plus 50 ppm of the test acrylonitrile compound. The batches were inoculated with a mixed spore suspension and incubated as previously. Extracts of the meat batches were taken at 10, 20 and 40 days, and at such periods of time, two mice were injected with extracts of each batch.

The following Table III summarizes the results of these tests. Toxin production in the meat batches during storage is shown by mortality effects on the mice.

TABLE III

| Test No. | Nitrite (ppm) | Test Compound (ppm) | No. mice (of 2) which died after injection | | |
|---|---|---|---|---|---|
| | | | 10 days | 20 days | 40 days |
| 1 | 0 | 0 | 2 | 2 | 2 |
| 2 | 0 | 0 | 2 | 2 | 2 |
| 3 | 0 | 0 | 2 | 2 | 2 |
| 4 | 40 | 0 | 0 | 2 | 2 |
| 5 | 40 | 0 | 0 | 2 | 2 |
| 6 | 40 | 0 | 0 | 2 | 2 |
| 7 | 40 | 50 | 0 | 0 | 0 |
| 8 | 40 | 50 | 0 | 0 | 1 |
| 9 | 40 | 50 | 0 | 0 | 0 |
| 10 | 120 | 0 | 0 | 0 | 0 |
| 11 | 120 | 0 | 0 | 0 | 0 |
| 12 | 120 | 0 | 0 | 0 | 0 |

What is claimed is:

1. A method of inhibiting the growth of *Clostridium botulinum* in meat products comprising incorporating into a meat product an effective amount of the compound 3-(4-tolylsulfonyl) acrylonitrile and an alkali metal nitrite salt in an amount less than 120 ppm.

2. A process according to claim 1 in which the nitrite salt is sodium nitrite.

3. A process according to claim 1 in which the acrylonitrile compound is incorporated in an amount of between about 25 and about 50 ppm in the meat product.

4. A process according to claim 3 in which the alkali metal nitrite salt is incorporated in the meat product in an amount of about 40 ppm.

* * * * *